(12) United States Patent
LeBlond et al.

(10) Patent No.: US 9,702,490 B2
(45) Date of Patent: Jul. 11, 2017

(54) SEALING METHOD FOR SILICON CARBIDE PARTS USED AT HIGH TEMPERATURES

(71) Applicant: CORNING INCORPORATED, Corning, NY (US)

(72) Inventors: Nicolas LeBlond, Painted Post, NY (US); Mehrdad Mahmoudi, Phoenix, AZ (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/260,799

(22) Filed: Apr. 24, 2014

(65) Prior Publication Data
US 2014/0318659 A1    Oct. 30, 2014

Related U.S. Application Data

(60) Provisional application No. 61/817,574, filed on Apr. 30, 2013.

(51) Int. Cl.
| | |
|---|---|
| *B65H 69/02* | (2006.01) |
| *C03B 29/00* | (2006.01) |
| *B29C 65/00* | (2006.01) |
| *F16L 23/22* | (2006.01) |
| *F16L 25/00* | (2006.01) |
| *F16L 23/18* | (2006.01) |

(Continued)

(52) U.S. Cl.
CPC ............. *F16L 23/18* (2013.01); *B32B 18/00* (2013.01); *B32B 37/14* (2013.01); *B32B 37/16* (2013.01);

(Continued)

(58) Field of Classification Search
CPC ........ B23K 35/24; B23K 1/008; B32B 17/06; B32B 37/16; B32B 18/00; B32B 37/14;
(Continued)

(56) References Cited

U.S. PATENT DOCUMENTS

| | | |
|---|---|---|
| 3,932,162 A | 1/1976 | Blankenship |
| 4,070,197 A | 1/1978 | Coes et al. ...................... 106/44 |

(Continued)

FOREIGN PATENT DOCUMENTS

| | | | | | |
|---|---|---|---|---|---|
| FR | WO 2010049909 A1 | * | 5/2010 | ......... | C04B 38/0051 |
| GB | 2072313 A | * | 9/1981 | ................ | F27B 5/10 |

(Continued)

OTHER PUBLICATIONS

Briot et al. "WO 2010/049909, machine translation", published May 6, 2010.*

(Continued)

*Primary Examiner* — Alex Efta
(74) *Attorney, Agent, or Firm* — Svetlana Z. Short; Joseph E. Gortych

(57) ABSTRACT

The present disclosure describes silicon carbide articles useful at high temperatures, and the method of making them. The method includes: providing a plurality of silicon carbide parts; providing a mullite gasket; placing the gasket between the ends of the parts to be joined to thereby form an assembly; applying a load in the range of 15-25 pounds per square inch to the parts' ends distal from the gasket to thereby press the gasket; heating the assembly in a muffle furnace under load to a temperature in the range of 1450° C. to 1550° C.; increasing the load on the to range of 30-50 pounds per square inch and holding the assembly at the temperature for a time in the range of 2-5 days to adhere the mullite gasket to the ends of the silicon carbide parts.

16 Claims, 2 Drawing Sheets

(51) Int. Cl.
*B32B 37/14* (2006.01)
*F16L 9/22* (2006.01)
*B32B 18/00* (2006.01)
*B32B 37/16* (2006.01)
*C04B 35/565* (2006.01)
*C04B 35/185* (2006.01)
*C04B 35/645* (2006.01)
*C04B 37/00* (2006.01)
*C04B 37/04* (2006.01)

(52) U.S. Cl.
CPC .......... *C04B 35/185* (2013.01); *C04B 35/565* (2013.01); *C04B 35/645* (2013.01); *C04B 37/001* (2013.01); *C04B 37/005* (2013.01); *F16L 9/22* (2013.01); *C04B 37/045* (2013.01); *C04B 2235/6567* (2013.01); *C04B 2235/72* (2013.01); *C04B 2235/79* (2013.01); *C04B 2237/06* (2013.01); *C04B 2237/062* (2013.01); *C04B 2237/341* (2013.01); *C04B 2237/365* (2013.01); *C04B 2237/76* (2013.01); *C04B 2237/765* (2013.01); *C04B 2237/84* (2013.01); *F16L 23/22* (2013.01); *F16L 25/0009* (2013.01); *F16L 25/0018* (2013.01); *Y10T 156/10* (2015.01)

(58) Field of Classification Search
CPC  C03C 3/087; C03C 3/083; C03C 3/04; C04B 2237/10; C04B 37/04; C04B 37/00; C04B 35/565; C04B 2237/365; C04B 2237/06; C04B 2237/068; C04B 35/185; C04B 37/005; C04B 37/045; C04B 2237/76; C04B 2237/84; F16L 23/22; F16L 25/0009; F16L 25/0018
See application file for complete search history.

(56) References Cited

U.S. PATENT DOCUMENTS

| | | | | |
|---|---|---|---|---|
| 4,499,360 A | | 2/1985 | Rottenbacher et al. ........ 219/85 |
| 4,640,899 A | | 2/1987 | Hillig et al. | |
| 4,762,269 A | * | 8/1988 | Gyarmati .............. C04B 35/645 |
| | | | | 156/89.17 |
| 5,183,490 A | | 2/1993 | Mikami et al. | |
| 5,407,504 A | * | 4/1995 | Ewart-Paine ......... C04B 37/005 |
| | | | | 156/306.6 |
| 6,467,310 B2 | | 10/2002 | Terashima et al. | |
| 7,462,255 B2 | | 12/2008 | Knorr et al. | |
| 7,695,580 B2 | | 4/2010 | Cutler et al. | |
| 2003/0003329 A1 | * | 1/2003 | Wang .................... C04B 41/009 |
| | | | | 428/698 |
| 2003/0138596 A1 | * | 7/2003 | Harada .............. B01D 39/2068 |
| | | | | 428/116 |
| 2007/0166570 A1 | * | 7/2007 | Cutler ................ C04B 35/2641 |
| | | | | 428/701 |
| 2008/0304959 A1 | | 12/2008 | Benoit et al. ................. 415/200 |
| 2010/0055498 A1 | * | 3/2010 | Mailliart ............... C04B 35/195 |
| | | | | 428/698 |
| 2010/0255289 A1 | * | 10/2010 | Lewinsohn .......... C04B 35/195 |
| | | | | 428/325 |
| 2012/0304701 A1 | | 12/2012 | Inoue | |
| 2013/0266363 A1 | * | 10/2013 | Khalifa .................. B32B 37/16 |
| | | | | 403/270 |

FOREIGN PATENT DOCUMENTS

| | | |
|---|---|---|
| JP | 09188580 A * | 7/1997 |
| JP | 2012051807 A | 3/2012 |
| WO | 2012102378 | 8/2012 |

OTHER PUBLICATIONS

Ishiguro et al. "JP 09-188580, machine translation", published Jul. 22, 1997.*
Database WPI, Thomson Scientific, London, GB; AN 1983-709021, XP002726722, & JP S58 95667 A (Toyota Jidosha KK), Jun. 7, 1983, Abstract.
Wahl et al; "Phase Transformations in Silica-Alumina Mixtures as Examined by Continuous X-Ray Diffraction" The American Mineralogist, vol. 46, Sep.-Oct. 1961; 13 Pages.
International Search Report and Written Opinion PCT/US2014/035644 Dated Jul. 23, 2014.

* cited by examiner

SEALING METHOD FOR SILICON CARBIDE PARTS USED AT HIGH TEMPERATURES

CROSS-REFERENCE TO RELATED APPLICATIONS

This application claims the benefit of priority of U.S. Application Ser. No. 61/817,574 filed on Apr. 30, 2013, the content of which is relied upon and incorporated herein by reference in its entirety.

FIELD

The disclosure is directed to a method for joining together silicon carbide (SiC) parts with a mechanically strong and vacuum-tight seal useable at temperatures up to at least 1500° C. In particular, the method can be used to make long silicon carbide tubular elements that can be used as a vacuum vessel for consolidating optical fiber preforms at reduced pressures.

BACKGROUND

The state of the art of the various methods for joining SiC parts has been described in patent application US2010/0055498. Typically these methods require that a joining compound to be applied between the SiC parts and fired in a reducing atmosphere (e.g., nitrogen, argon, vacuum) due to the reactivity of the compounds with the oxygen in air. The method described in US2010/0055498 consists of preparing a glass fit (with composition $SiO_2/Al_2O_3/CaO$ or $Al_2O_3/CaO/MgO$), mixing the fit with an organic binder, applying the frit/binder to the SiC parts to be joined and firing in air at a temperature between 1100 and 1650° C. The resulting joint is described as being leak-tight at temperatures up to 1200° C. depending on the composition of the fit.

The maximum operating temperature of 1200° C. in the frit sealing method described above is a limiting factor for some applications such as the consolidation of optical fiber preforms which can require temperatures above 1450° C. for several hours. The size of the SiC vessel for the fiber preform for such an application would be 12 to 18 inches in diameter and 12 to 18 feet in length. Such a large SiC part cannot be made with the current manufacturing process, so it must be made by assembling multiple tube sections. Thus, it is desirable to use a joint material that enables the formation of SiC vessels having a diameter of 12-18 inches and a length of 12-18 feet from shorter lengths of SiC tubing. The joint material should be usable at temperatures of up to at least 1500° C. and provide leak-tight seals.

SUMMARY

The present disclosure describes a silicon carbide element, and the method and materials used for making the element. The method and the elements made using the method can be used in many high temperature manufacturing processes to make many different articles. In one aspect the disclosure is directed to a method for joining, and sealing, at least two shaped silicon carbide parts, and in particular, joining and sealing silicon carbide parts using a mullite material to join the SiC parts together to form an SiC vessel. The method comprises providing a plurality of silicon carbide parts; placing a mullite gasket between the ends of the parts to be joined to thereby form an assembly; and heating the assembly to cause the silicon carbide parts to adhere to one another. In an embodiment the method further comprises, during the heating step, applying a load in the range of 15-25 pounds per square inch to the parts' ends that are distal from the gasket to thereby press the gasket. In an embodiment the method also comprises heating the assembly in a muffle furnace under load to a temperature in the range of 1400° C. to 1600° C. In an embodiment the heating rate in the range of 3-8° C. per minute to a temperature within the range of 1400° C. to 1600° C. In an embodiment the method comprises increasing the load on the assembly to 30-60 pounds per square inch and holding the assembly at the temperature for a time in the range of 2-5 days to adhere the mullite gasket to the ends of the silicon carbide parts. In an embodiment the assembly is heated to a temperature of 1500±20° C. for 2 days under a load of 50-60 pounds per square inch. In an embodiment the heating is done in air.

The disclosure is further directed to a method for joining and sealing silicon carbide tubes, the method comprising providing a plurality of silicon carbide tubes having a length, and an inner diameter and an outer diameter, and a first end and a second end, the difference between the inner and outer diameter defining the wall thickness of the tube; a mullite gasket sized to fit the wall thickness of end(s) to be joined. The gasket is placed between the ends of said tubes to be joined and the resulting assembly of tubes and gaskets is taped at each gasket/tube joint to hold the gasket in place. A load in the range of 15-25 pounds per square inch is applied to the tube ends distal from the gasket(s) to thereby press the gasket(s) together. The assembly is heated in air under load to a temperature in the range of 1400° C. to 1600° C. to adhere the silicon carbide tubes to one another. In an embodiment the heating rate is in the range of 3-8° C. per minute to a temperature within the range. In an embodiment the load is increased to 30-60 pounds per square inch during the heating and the assembly is held at the temperature for a time in the range of 2-5 days to adhere the mullite gasket to the ends of the silicon carbide tubes. In one embodiment the assembly is heated to a temperature of 1500±20° C. In an embodiment the assembly is held at the temperature of 1500±20° C. for a time in the range of 3-4 days. In another embodiment, when the plurality of tubes have an outer diameter of greater than 4 inches and a length of more than 2 feet per tube. In an embodiment the tubes are heated in the muffle furnace in the vertical position and the weight of the tubes provides at least part of the load. When the joined and sealed tubes are evacuated to a pressure of 0.05 atmosphere and leak tested, and the leak rate is less than 4 sccm.

Advantages of the joint material and the resulting joint are:

1. The material is non-reactive toward SiC, and contains minimal amounts of alkali and alkaline earths materials which can cause bubbling and corrosion of the SiC material at temperatures above 1200° C.
2. It is compatible with an oxidizing atmosphere such as air in order to simplify its application without the need for costly atmosphere-controlled furnaces.
3. It provides good adhesion to the SiC parts, forming a mechanically strong bond that is comparable in strength to the bulk SiC material.
4. It has a coefficient of thermal expansion (CTE) comparable to that of SiC (4.3 ppm/° C.) to allow the resulting assembly to be thermally cycled (cooling and heating), for example, between the maximum temperature and room temperature, without cracking.
5. The joint material is chemically and physically stable at operating temperatures up to at least 1500° C. in order to maintain the integrity of the joint and seal.

6. The joint material forms a leak-tight seal, i.e., prevents gases from migrating from one side of the joint to the other.

The disclosure describes a method for joining silicon carbide parts that meet all the above requirements. The method is especially applicable to large parts of varying shapes such as tubes, plates, concave-convex parts, tubes to plates, mated saw-toothed parts and parts having other shapes capable of being joined and sealed using the teachings presented herein. One additional advantage of the present disclosure over the prior art is that the use of a solid gasket material prevents the joint material from being squeezed out of the joints, which would likely occur for paste-type joining materials. In addition, organic binders are not used with the mullite gasket method described herein. These organic binders, which are often required in paste-type joining materials, can lead to the formation of bubbles within the joint after firing, which in turn may lead to structural failure and/or leakage.

DETAILED DESCRIPTION

Figure 1:
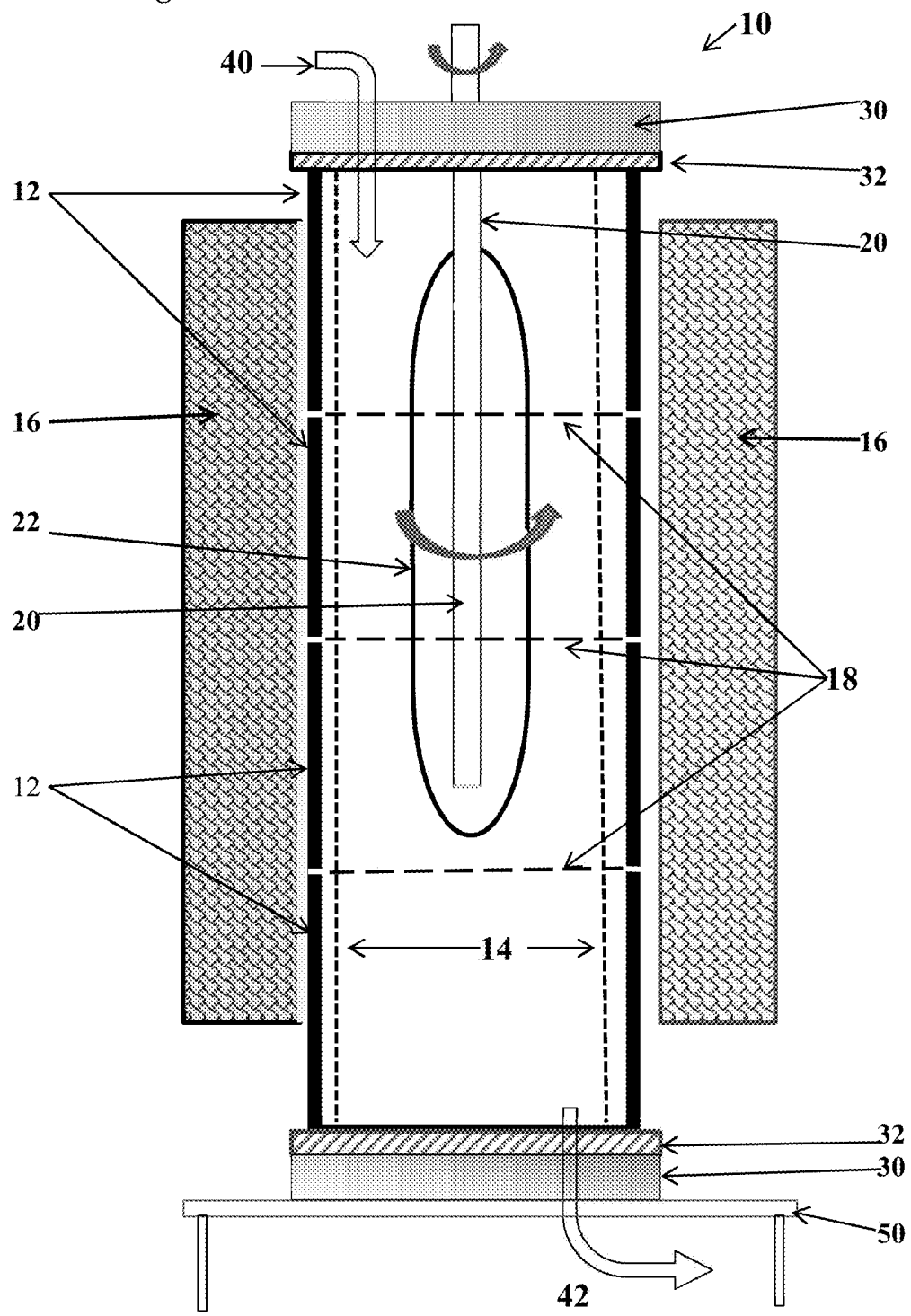
FIG. 1 is diagram of the basic features of an apparatus 10 that can be used one or more of the steps of dehydrating, degassing and consolidating an optical fiber soot blank into an optical fiber glass preform; the apparatus 10 including a long SiC tube made from a plurality of smaller tubes 12 using the mullite seals 18 that are disclosed herein
Figure 2:
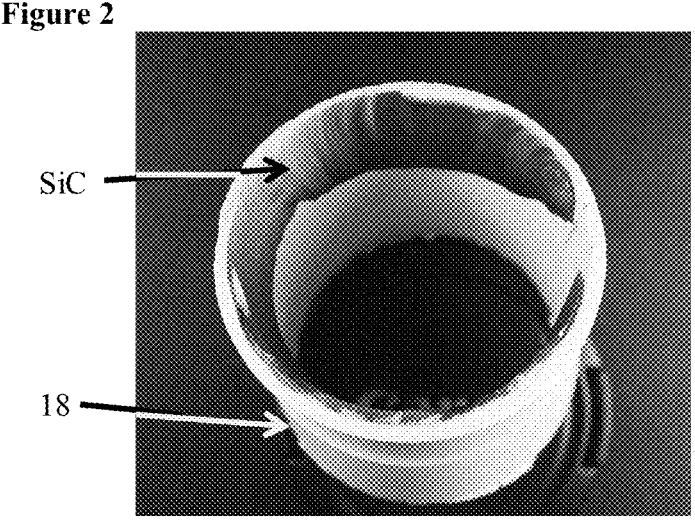
FIG. 2 is a picture of a mullite seal 18 removed from a SiC tube after being heated to 1500° C. for several days; the picture showing that the mullite has been fused to the SiC tube, thus illustrating the strong mechanical seal that formed between the mullite seal and the SiC part.

In the following detailed description, numerous specific details may be set forth in order to provide a thorough understanding of embodiments of the invention. However, it will be clear to one skilled in the art when embodiments of the invention may be practiced without some or all of these specific details. In other instances, well-known features or processes may not be described in detail so as not to unnecessarily obscure the disclosure. In addition, like or identical reference numerals may be used to identify common or similar elements. Herein SiC tubes will be used as exemplary parts that can be joined as described below. The ends of the tubes that are joined can have different shapes as described herein. If "n" pipes represents the number of pipes to be joined, then the n−1 gaskets are required to form an assembly of joined pipes. Thus, as is illustrated in FIG. 1, to join four pipes 12 together requires three mullite seals (gaskets) 18.

The present disclosure describes a silicon carbide article, and the method and materials used for making the article. The method and articles made using the method can be used in many high temperature manufacturing processes to make many different articles.

The present disclosure is directed to a method for joining, and sealing, silicon carbide tubes that are used for different purposes which include, without limitation, consolidating optical fiber soot blanks into optical fiber glass preforms at high temperature above 1400° C. and reduced pressure. The preform consolidation is carried out in high temperature muffle furnaces. The main challenge in implementing the method described herein lay in the identification of a material that is strong enough to withstand vacuum conditions at preform consolidation temperatures, which are generally greater than 1450°.

At the present time SiC is the only cost-effective material that is strong enough to hold a vacuum at 1450° C. without deforming. However, since silicon carbide tubes having a large outer diameter, for example 12 to 16 inches, and long length, for example 12 to 16 feet, are currently not available, it is necessary to join several tubes of shorter length to obtain the desired full sized tube. Presently, the longest cylindrical SiC tubes that can be produced are 4 feet long, so at least 3 or 4 tube sections would need to be stacked to make a full-length tube of 12-16 feet. The next issue is to find a method to hermetically seal these tube sections together so that an appropriate level of vacuum can be achieved during the consolidation process.

The advantages of using a mullite gasket sealing method over other methods are:
1. The sealing process does not require an inert atmosphere and can be done in air at around 1500° C.
2. The mullite gasket/silicon carbide assembly retains its hermeticity after being cooled to room temperature and reheated to process temperature, which may not be the case for some glass-based sealing methods.
3. The mullite gasket sealing method does not require a temperature that is above that reachable by a consolidation furnace (1500° C. or slightly above), unlike some brazing method which require 1600-2000° C. temperatures.
4. The mullite material has very little and very localized reactivity with the silicon carbide. Reactivity of a sealing compound with silicon carbide would result in pitting, corrosion, and eventually failure of the seal.
5. Glass-based seals may require a tongue-in-groove joint in order to keep the liquid glass within the joint area.

The preferred mullite gasket material is a high silica mullite material. The mullite material used as the gasket material to join the SiC pipes comprises a combined $Al_2O_3$ plus $SiO_2$ ($Al_2O_3+SiO_2$) content of at least 95 wt. % and 5 wt. % or less modifiers and impurities. The modifiers in the gasket material include alkali and alkaline earth metal oxides, and selected transition metal oxides; for example, oxides of sodium, potassium, calcium, magnesium, barium, titanium, iron, titanium and zirconium. In an embodiment the mullite material comprises a combined $Al_2O_3$ plus $SiO_2$ content of at least 97 wt. % and 3 wt. % or less modifiers and impurities.

FIG. 1 is a diagram of a consolidation apparatus in which four SiC tubes 12 were joined together using a mullite gasket material 18. Other elements in FIG. 1 are an inner SiO tube 14; muffle furnace walls 16 for heating the apparatus elements within the furnace; the optical fiber soot blank 22: glass rod 20 on which the soot is deposited and which will form the core of the optical fiber after consolidation of the soot and drawing; water cooled aluminum caps 30 and Grafoil gaskets 32; at least one pair of ports 40 for the admission selected gases and soot forming vapors; and a stand 50 on the assembled SiC assembly stands with the muffle furnace surrounding it, the furnace being held in place by supports that are not illustrated. The un-numbered curved arrows indicate a rotation direction for the optical fiber soot preform during dehydration, degassing and consolidation.

The disclosure also describes a method of joining a plurality of silicon carbide tube sections in order to form a hermetic seal for operation at high temperature. The joint is made of a fully dense mullite gasket that sits between two SiC tube sections. The assembly is then heated for 3-4 days in air to 1500° C. under slight load (if the tube sections are large, their weight may provide sufficient load). At this temperature the mullite slowly creeps and conforms to the SiC faces. The composition of the mullite (an aluminosilicate) provides excellent adhesion to the silicon carbide and is sufficiently in thermal expansion properties (CTE) to remain intact through wide temperature cycles.

As an example of the disclosure, two silicon carbide parts or tubes were used to make a longer tube having butt (flat) joints. The parts that were used were 2 inch (50.8 mm) outer diameter ("o.d.") and 24 inches (635 mm) in length, had a 0.19 inch (4.8 mm) wall thickness, and were closed at one end. Each tube was cut 4 inches from the closed end and the cut faces were ground using a 125 micron diamond grinding disc to provide a flat face. A mullite gasket was made by cutting a 7 mm slice of 2 inch (50.8 mm) o.d. mullite tubing from CoorsTek (Fremont, Calif.) and that was polished to a 6 mm thickness using 60 grit SiC paper to smooth rough spots. The gasket was placed between the faces of the tube sections and held in place with an adhesive tape. The assembly was loaded into a tube furnace and a load of 15-25 lbs. was placed on the assembly in order to keep the gasket in place during heat-up. The furnace temperature was ramped at the rate of 5° C./min to 1500° C. (air atmosphere), at which point the load was increased to 50 lbs. After 10 days at 1500° C. in air, leak testing was performed followed by temperature cycling between 1250° C. and 1500° C. at 5° C./min 12 times a day in order to provide an accelerated model of the consolidation process. After 166 cycles the furnace was cooled at a rate of 5° C./min to 20° C. and reheated at a rate of 5° C./min to 1500° C. Leak testing was resumed for an additional 3 days.

The mullite gasket sealing method was then tested on a larger scale using a 5.3 inch diameter, 12 foot length SiC tube and assembled as described above. In this case the mullite gasket was placed within a lap joint rather than a butt joint in order to limit the amount of creep from the gasket. The leak testing was performed for several days and included temperature cycling as described above.

The leak testing was carried out by evacuating the assembled tube, whose ends were sealed using at least one cap with a valve and a Grafoil gasket, evacuating the tube using a vacuum pump to a pressure of 0.05 atmosphere, isolating the tube from the pump by closing a valve, and monitoring the pressure inside the tube over time. The leak rate was found to be less than $4 \times 10^{-2}$ sccm (standard cubic centimeters per minute). In one embodiment the leak rate was less than $3 \times 10^{-2}$. The leak rate was calculated by taking the slope of the pressure versus time over 10 minutes. This value was then multiplied by the volume of the tube to give a leak rate in atm.·cm$^3$/s. This value can then be converted to sccm by multiplying by 60 s/min×300K/1773K. The lowest detectable leak rate the measuring device was capable of for a 10 minute leak test is $1.35 \times 10^{-3}$ atm.·cm$^3$/second ($1.37 \times 10^{-2}$ sccm). The measured leak rate for a 10 minute leak test using for the seal made using a mullite gasket disclosed herein was $2.70 \times 10^{-3}$ atm.·cm$^3$/second ($2.74 \times 10^{-2}$ sccm), which is twice the lowest detection level of the measuring device and is an excellent result, and shows the utility of the disclosed seal. To give a better idea of what this represents, the measured pressure inside the evacuated tube increased by only 0.002 atmosphere over a 10 minute period after the tube was isolated from the vacuum pump. The leak rate was substantially the same using either 2 inch o.d. and 5.3 inch o.d. SiC tubes.

As mentioned above, there are several methods for joining parts made of silicon carbide. The methods that would produce the most hermetic seal (e.g., direct sintering) require a firing step in a vacuum or an inert atmosphere, which is a challenge for very large parts such as consolidation muffle tubes that are as the large SiC tubes described herein. Glass-based sealing methods can be used in air, but the temperature needed to produce the seal must be several hundred degrees higher than the operating temperature of the glass; that is, the glass must be sufficiently fluid to join the tubes, but must also be very viscous to provide a stable seal. In addition, glass sealing, as with the SiC powder/adhesive method, requires a large high-temperature furnace. Laser brazing of a glass-based frit is promising, but the equipment/protocol is not yet available for large parts. The advantage of using mullite is that the material is non-reactive to silicon carbide; it creeps near the maximum temperature of the consolidation furnaces currently available; it is impervious to gases; and it is close in CTE to and bonds strongly to silicon carbide.

The mullite material used as the gasket material to join the SiC pipes comprises at least 95 wt. % $Al_2O_3$ plus $SiO_2$ and 5 wt. % or less modifiers and impurities. In an embodiment the mullite material comprises at least 97 wt. % $Al_2O_3$ plus $SiO_2$ and 3 wt. % or less modifiers and impurities. In an embodiment the $Al_2O_3/SiO_2$ molar ratio in the gasket is in the range of 0.5:1 to 2:1. In an embodiment the $Al_2O_3/SiO_2$ molar ratio in the gasket is in the range of 0.8:1 to 1.8:1. In a further embodiment the $Al_2O_3/SiO_2$ molar ratio in the gasket is in the range of 1.1:1 to 1.8:1. The modifiers in the mullite gasket material include alkali and alkaline earth metal oxides, and selected transition metal oxides; for example, oxides of sodium, potassium, calcium, magnesium, barium, titanium, iron, titanium and zirconium. In an embodiment, as oxides, the sodium plus potassium content in the gasket is less than 2 wt. %; the iron plus titanium plus zirconium content is less than 1.8 wt. %; and the calcium plus magnesium plus barium content is less than 1.2 wt. %. In another embodiment, as oxides, the sodium plus potassium content in the gasket is less than 1. wt. %; the iron plus titanium plus zirconium content is less than 1.2 wt. %; and the calcium plus magnesium plus barium content is less than 0.8 wt. %.

The mullite material(s) as described above can be used to make silicon carbide articles by use the mullite material(s) to bond together a plurality of parts to form an article. By way of an example, one can make a tubular silicon carbide article that comprises a plurality of silicon carbide tubular parts having opposing end faces and an inner and an outer diameter and a mullite gasket bonding at least one end face of one of the parts to an end face of another of the parts to thereby form a silicon carbide tubular article comprising a plurality of parts, the article having opposing end faces. The silicon carbide article had a leakage rate of less than $4 \times 10^{-2}$ sccm at a reduced pressure in the range of 0.5 atmosphere. The mullite gasket comprised at least 95 wt. % $Al_2O_3$ plus $SiO_2$ and 5 wt. % or less modifiers and impurities; and the $Al_2O_3/SiO_2$ molar ratio in the gasket is in the range of 0.5:1 to 2:1.

Figures 3A, 3B, 3C:
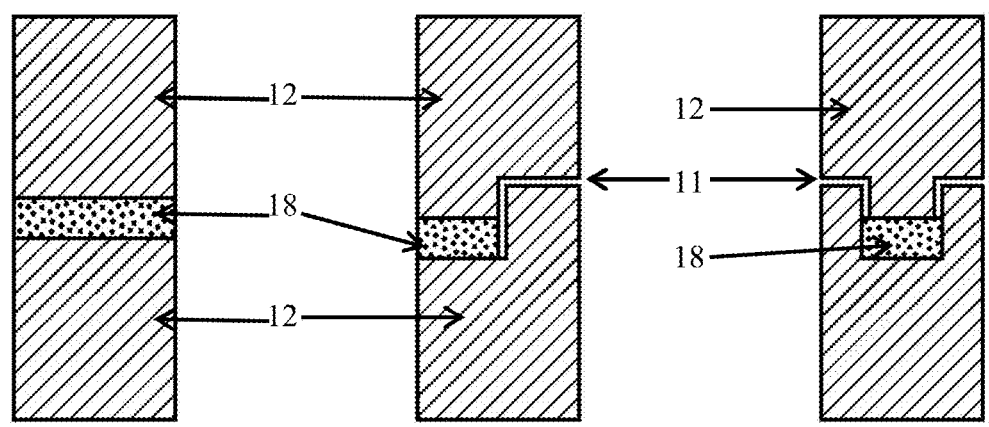
FIGS. 3A-3C are illustrations of exemplary joint shapes with which the mullite gasket disclosed can be used.

Alternative embodiments would consist of modifying the currently available mullite compositions in order to better match its CTE to that of silicon carbide. In addition, substituting any alkali metals present in the presently availably mullite materials with oxides that are more compatible with silicon carbide would likely provide a longer life to the joint assembly. In the current invention the joint faces are flat, but in an alternate embodiment the faces could be shaped in a way that would prevent the mullite from creeping too much after the initial seal has been achieved. FIGS. 3A-3C are illustrations of exemplary faces that can be joined using the mullite gasket material disclosed herein; and in the Figures the hatched area 12 is SiC part and the polka-dotted area 18 is the mullite. FIG. 3A illustrates a butt (flat) joint, FIG. 3B illustrates a lap joint and FIG. 3C illustrates a tongue-in-groove joint. In FIGS. 3B and 3C the areas 11 are gaps that are needed to allow the gasket to deform under load and generate the seal.

We claim:

1. A method for joining and sealing at least two silicon carbide parts, the method comprising:
    placing a solid fully dense mullite gasket between and in contact with ends of at least two silicon carbide parts to be joined to thereby form an assembly, wherein said solid fully dense mullite gasket comprises a combined $Al_2O_3$ plus $SiO_2$ content of at least 97 wt. % and 3 wt. % or less of oxide modifiers; and
    heating the assembly so that the solid fully dense mullite gasket forms a bond between the ends of the at least two silicon carbide parts, wherein the bond is chemically and physically stable at operating temperatures of up to 1500° C.

2. The method according to claim 1, wherein the act of heating the assembly comprises applying a load in the range of 15-25 pounds per square inch to ends of the at least two silicon carbide parts that are distal from the ends of the at least two silicon carbide parts to be joined.

3. The method according to claim 1, wherein the act of heating the assembly comprises heating the assembly in a muffle furnace under load to a temperature in the range of 1450° C. to 1600° C.

4. The method according to claim 1, wherein the oxide modifiers are selected from the group consisting of oxides of sodium, potassium, calcium, magnesium, barium, titanium, iron, titanium and zirconium.

5. The method according to claim 1, wherein said at least two silicon carbide parts are silicon carbide tubes having a length, an inner diameter and an outer diameter, wherein the difference between the inner and outer diameters defines the wall thickness of a tube.

6. The method according to claim 1, wherein the oxide modifiers comprise less than 2 wt. % of sodium and potassium oxides, less than 1.8 wt. % of iron, titanium and zirconium oxides, and less than 1.2 wt. % of calcium, magnesium and barium oxides.

7. The method according to claim 1, wherein the oxide modifiers comprise less than 1 wt. % of sodium and potassium oxides, less than 1.2 wt. % of iron, titanium and zirconium oxides, and less than 0.8 wt. % of calcium, magnesium and barium oxides.

8. The method according to claim 1, wherein the act of placing the solid fully dense mullite gasket comprises placing the solid fully dense mullite gasket within a butt joint at the ends of the at least two silicon carbide parts to be joined.

9. The method according to claim 1, wherein the act of placing the solid fully dense mullite gasket comprises placing the solid fully dense mullite gasket within a lap joint at the ends of the at least two silicon carbide parts to be joined.

10. The method according to claim 1, wherein the act of placing the solid fully dense mullite gasket comprises placing the solid fully dense mullite gasket within a tongue-in-groove joint at the ends of the at least two silicon carbide parts to be joined.

11. The method according to claim 1, wherein said solid mullite gasket has a $Al_2O_3/SiO_2$ molar ratio in the range of 0.5:1 to 2:1.

12. The method according to claim 11, wherein said $Al_2O_3/SiO_2$ molar ratio is in the range of 0.8:1 to 1.8:1.

13. The method according to claim 11, wherein said $Al_2O_3/SiO_2$ molar ratio is in the range of 1.1:1 to 1.8:1.

14. A method for joining and sealing at least two silicon carbide parts, the method comprising:
    placing a solid mullite gasket between and in contact with ends of at least two silicon carbide parts to be joined to thereby form an assembly, wherein said solid mullite gasket comprises a combined $Al_2O_3$ plus $SiO_2$ content of at least 97 wt. % and 3 wt. % or less of oxide modifiers; and
    heating the assembly so that the solid mullite gasket forms a bond between the ends of the at least two silicon carbide parts, wherein the bond is chemically and physically stable at operating temperatures of up to 1500° C., wherein the act of heating the assembly comprises applying a load in the range of at least 30-60 pounds per square inch to ends of the at least two silicon carbide parts that are distal from the ends of the at least two silicon carbide parts to be joined and holding the assembly at a temperature in the range of 1450° C. to 1600° C. for a time in the range of 2-5 days.

15. A method for joining and sealing at least two silicon carbide parts, the method comprising:
    placing a solid mullite gasket between and in contact with ends of at least two silicon carbide parts to be joined to thereby form an assembly, wherein said solid mullite gasket comprises a combined $Al_2O_3$ plus $SiO_2$ content of at least 95 wt. % and 5 wt. % or less of modifiers; and
    heating the assembly so that the solid mullite gasket forms a bond between the ends of the at least two silicon carbide parts, wherein the bond is chemically and physically stable at operating temperatures of up to 1500° C., and further comprising applying a load in the range of at least 30-60 pounds per square inch to ends of the at least two silicon carbide parts that are distal from the ends of the at least two silicon carbide parts to be joined and holding the assembly at a temperature in the range of 1450° C. to 1600° C. for a time in the range of 2-5 days.

16. A method for joining and sealing at least two silicon carbide parts, the method comprising:
    placing a solid fully dense mullite gasket between and in contact with ends of at least two silicon carbide parts to be joined to thereby form an assembly, wherein said solid fully dense mullite gasket consists essentially of a combined $Al_2O_3$ plus $SiO_2$ content of at least 95 wt. % and 5 wt. % or less of oxide modifiers; and
    heating the assembly so that the solid fully dense mullite gasket forms a bond between the ends of the at least two silicon carbide parts, wherein the bond is chemically and physically stable at operating temperatures of up to 1500° C.

* * * * *